United States Patent [19]

Ostrov

[11] Patent Number: 4,584,180

[45] Date of Patent: Apr. 22, 1986

[54] GAS INJECTION APPARATUS

[75] Inventor: Anatoly A. Ostrov, Windsor, Conn.

[73] Assignee: Cool Water Coal Gasification Program, Daggett, Calif.

[21] Appl. No.: 612,549

[22] Filed: May 21, 1984

[51] Int. Cl.[4] .......................... B01F 5/06; F22B 7/04; F27D 15/02; F28D 21/00

[52] U.S. Cl. ................................. 422/207; 48/DIG. 2; 122/138; 261/122; 366/340; 432/77

[58] Field of Search .................. 422/207, 194, 151; 261/122; 48/77, 67, DIG. 2; 122/7 R, 136 R, 138; 432/77; 366/336, 338, 340

[56] References Cited

U.S. PATENT DOCUMENTS

| 3,262,685 | 7/1966 | Pike et al. | 422/207 |
| 4,199,545 | 4/1980 | Matovich | 422/150 |
| 4,362,464 | 12/1982 | Stock | 415/108 |
| 4,406,747 | 9/1983 | Velling | 48/77 |
| 4,479,809 | 10/1984 | Johnson et al. | 48/77 |

Primary Examiner—Barry S. Richman
Assistant Examiner—C. Delahunty
Attorney, Agent, or Firm—Lyon & Lyon

[57] ABSTRACT

A gas injection apparatus for injecting a quench gas. The gas injection apparatus provides a means for injecting a quench gas into a hot gas contained in a vessel having an inner liner. The apparatus is designed such that the independent thermal expansions and contractions of the inner liner do not create excess thermal stresses on an expansible supply duct. The expansible supply duct provides the means for transferring the gas from outside the vessel into the gas stream. A plenum assembly, creating an interface between the expansible supply duct and the inner liner is sealably attached to the inner liner allowing perpendicular injection of the quench gas while maintaining the liner's integrity.

11 Claims, 5 Drawing Figures

GAS INJECTION APPARATUS

BACKGROUND OF THE INVENTION

The field of this invention is gas injection apparatus; more specifically, a gas injection apparatus for injecting a quench gas into a lined vessel.

When handling gases at elevated temperatures, it is sometimes necessary to inject a quench gas into the stream of hot gases. One of the processes in which injection of a quench gas is necessary is the coal gasification process. In the coal gasification process, a coal slurry is partially oxidized in a refractory lined gasifier vessel, producing a gas and a residue consisting of soot and molten slag. The hot gas discharged from the refractory lined gasifier is cooled in a radiant boiler to the point at which the molten slag is at least partially solidified but still sticky. The quench gas is utilized to cool the sticky residue to a temperature where it can be easily separated from the coal gas. In addition, to aiding in the separation of the fine particulate residues, the quench gas also lowers the temperature of the gas itself. The vessels and ducts used in this process are all lined either with refractory as in the gasifier or with a water wall as in the radiant cooler, because the temperature of the coal gas is in the range of 800° F. to 2500° F. Because of the problems associated with the injection of a quench gas in a lined vessel, producers of coal gas have had difficulty incorporating this step into their process.

One of the purposes of the liner in these vessels is to protect the vessel wall from being subjected to the high temperatures associated with the coal gas. Necessarily then, the liner is subjected to higher temperatures and larger temperature variations than the vessel wall. Because of this, the liners are installed in a manner allowing the inner liner to expand and contract independently of the vessel wall. The allowance of independent thermal expansion and contraction creates problems in providing a means for injecting a quench gas into the hot gaseous stream. To accomplish injection, a duct must pass through the vessel wall, bridge the gap between the vessel wall and the inner liner, and attach to the inner liner. In this arrangement the supply duct is subjected to external thermal stresses created by the independent contraction and expansion of the inner liner with reference to the vessel wall; and, is also subjected to internal thermal stresses as one end of the duct will be at a higher temperature than the other end since the liner is at a higher temperature than the vessel wall.

Other problems arise from the way the quench gas is injected into the hot coal gas. For the injection of the quench gas to be effective the gas must be injected such that there is adequate mixing of the quench gas and the hot coal gas. It has been determined that this mixing can best be achieved by injecting the quench gas normal to the flow of the hot coal gas. Since the vessels handling the hot coal gas are lined the radial injection normally results in the destruction of the integrity of the inner liner. The integrity is destroyed since gaps in the liner are created to allow the gas to be injected into the coal gas. The creation of gaps or elimination of the liner at the point of injection is not an adequate solution as the vessel walls will then be subjected to the hot raw coal gas. Attempts to minimize the gaps and maintain the liner's integrity have resulted in an increase in the number of fittings and headers. Increasing the number of fittings and headers in the liner is not an adequate solution as these extra fittings and headers provide additional points of potential failure for the inner liner.

As a result of these problems coal gas producers have either eliminated the injection of a quench gas from their process, causing operating problems, or adopted an injection method that eliminates the inner liner, resulting in high maintenance.

SUMMARY OF THE INVENTION

The present invention pertains to gas injection apparatus, wherein the gas injection apparatus is of the type for injecting a quench gas into a hot stream of gas being handled in a vessel having an inner liner.

To permit the radial injection of a quench gas in a vessel having an inner liner, an apparatus is needed that allows for the independent expansion and contraction of the inner liner and still maintains the integrity of the inner liner.

The disclosed gas injection apparatus employs an expansible supply duct and a plenum assembly to achieve the above-mentioned objects. The expansible supply duct is constructed such that the independent thermal expansion and contraction of the inner liner does not induce excessive internal or external thermal stresses on the duct. The plenum assembly, providing the interface between the expansible supply duct and the inner liner, is sealably attached to the outer surface of the inner liner. Openings in the liner provide communication between the area defined by the plenum assembly and the outer surface of the inner liner allow the quench gas to be injected normal to the coal gas stream. The method of attachment and the arrangement of the openings allow the integrity of the inner liner to be maintained without the need to add headers or fittings in the liner.

This apparatus, when utilized in a coal gasification process, allows for the injection of a quench gas which cools the coal gas and the particulate residue, making the process highly operable while maintaining the integrity of the inner liner. Thus, a quench gas may be injected perpendicular to the inner liner wall of a lined vessel while avoiding damaging thermal stresses on the apparatus and still protecting the vessel wall.

Accordingly, it is an object of the present invention to provide a gas injection apparatus for injecting quench gas into a lined vessel, which minimizes thermal stress on the apparatus and still maintains the integrity of the inner liner. Other and further objects and advantages will appear hereinafter.

DETAILED DESCRIPTION OF THE PREFERRED EMBODIMENT

Figure 1:
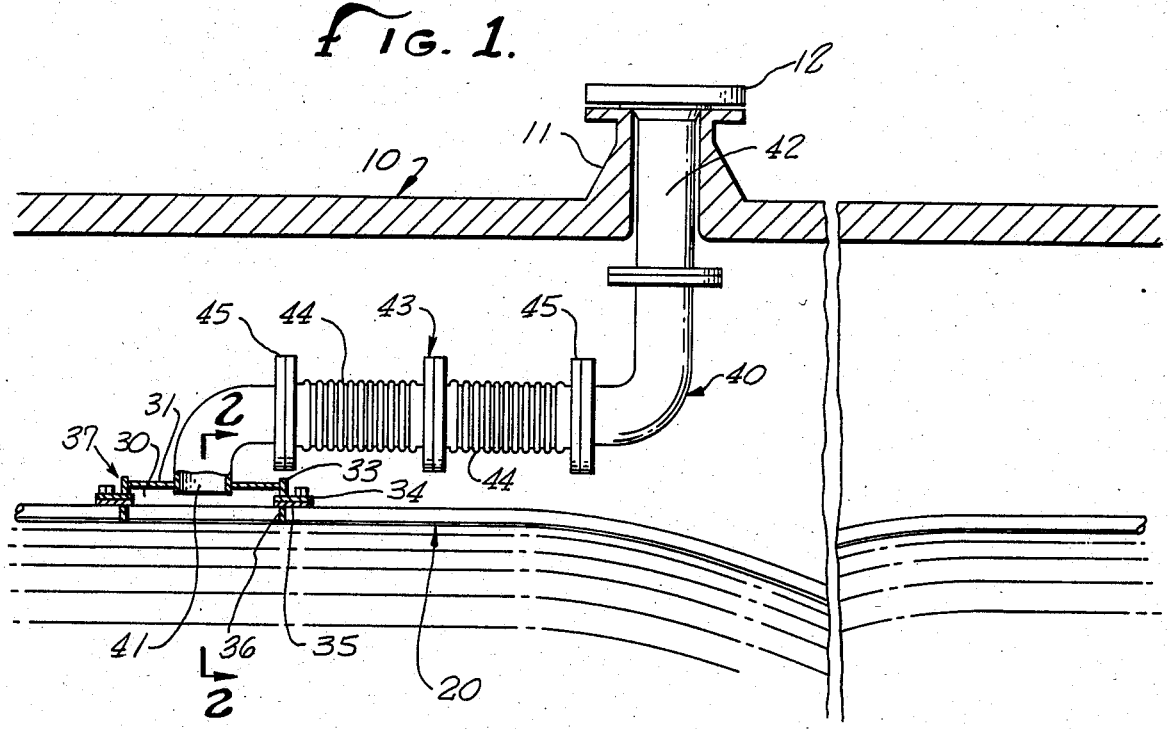
FIG. 1 is a schematic view of the gas injection apparatus.
Figure 2:
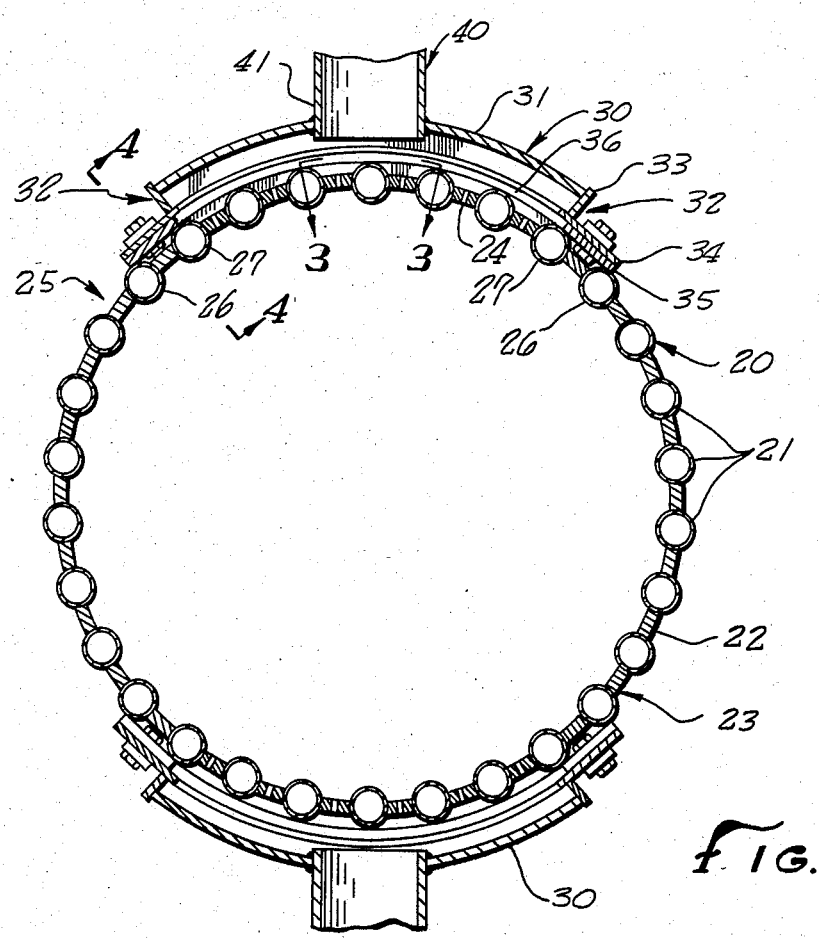
FIG. 2 is a sectional view taken along the plane 2—2 of FIG. 1, portraying two gas injection apparatus.
Figure 3:
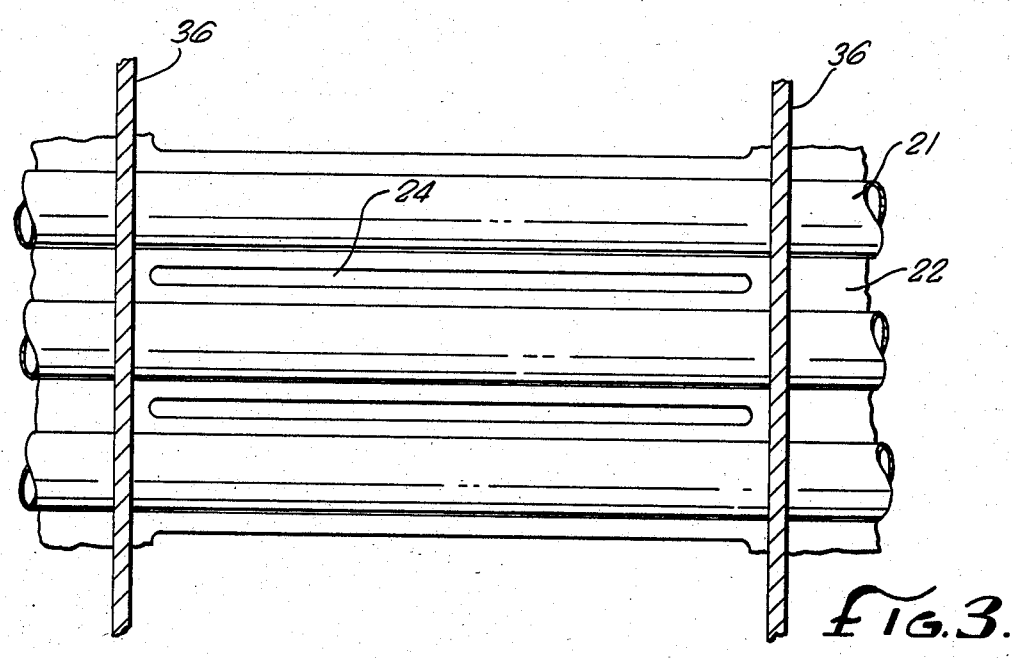
FIG. 3 is a sectional view taken along the plane 3—3 of FIG. 2.
Figure 4:
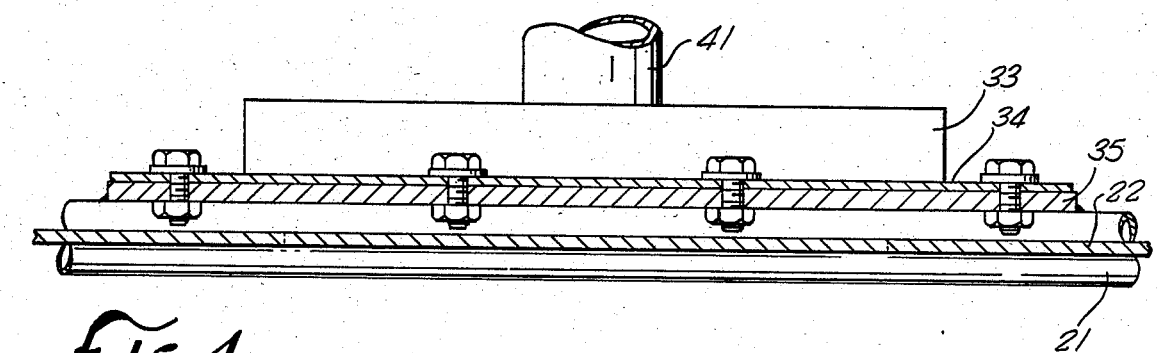
FIG. 4 is a sectional view taken along plane 4—4 of FIG. 2.
Figure 5:
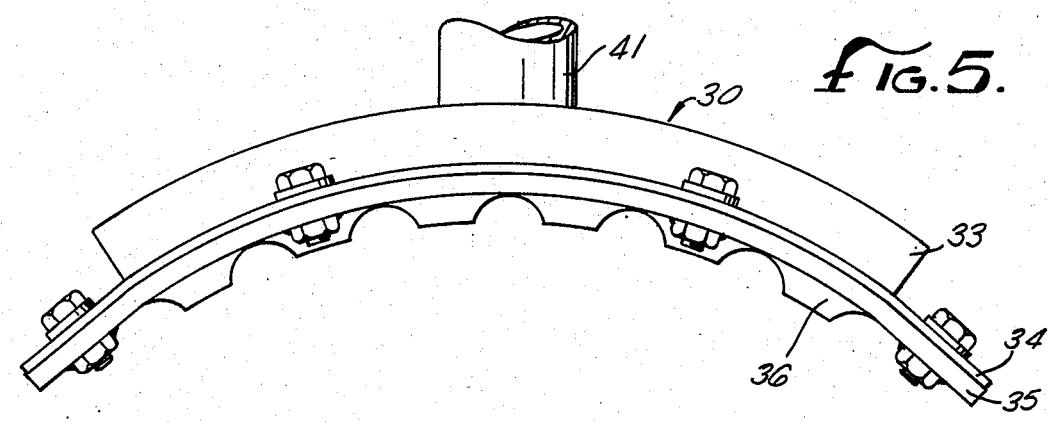
FIG. 5 is a sectional view of the scalloped segment attached to the upper lip in the absence of the liner.

With reference to FIG. 1, a portion of a vessel for handling gases at elevated temperatures is shown embodying a vessel wall 10 and an inner liner 20 spaced a distance apart. The inner liner 20 consists of a series of parallel tubes 21 radially joined together by web members 22 forming a cylinder, generally designated 23. The cylinder 23 is shown in FIG. 2.

Although the gas injection apparatus is shown being utilized to inject a quench gas into a horizontally flowing gas stream, the apparatus may be utilized to inject a quench gas into a gas stream flowing in any direction. Specifically, where it is desired to cool the hot gas and entrained particulate solids during their flow downward in a radiant cooler, and before the gas is diverted to a horizontal channel as described below, the gas injection apparatus may be disposed near the bottom of a radiant section, substantially as described in the following paragraphs, but modified as necessary by the requirements of the geometry of the vertical gas flow system.

A plenum assembly, generally designated 30, is sealably attached to the outer surface 25 of the inner liner 20 in such a manner that the integrity of the inner liner 20 is maintained. Openings, or in this embodiment slots 24, are made in the web members 22 in the area covered by said plenum assembly of the inner liner 20 to provide communication between the interior of the vessel and the area defined by the plenum assembly 30 and the outer surface of the inner liner 20. These slots 24, which run parallel to the tubes 21 are designed to allow the quench gas to be injected at low differential pressure normal to the flow of a hot gas. The plenum assembly 30 has a top 31 that is formed to follow the curvature of the outer surface 25 of the cylinder 23. The top 31 is attached to the liner 20 by sidewalls.

A first two sidewalls, generally designated 37, shown in FIG. 1, are parallel to each other and are the two sidewalls that are attached to the outer surface of the inner liner perpendicular to the longitudinal axes of the parallel tubes 21. The first two sidewalls 37 in the preferred embodiment are comprised of an assembly of various components. A bar 33 has one edge welded to the top 31 and the other edge welded to an upper lip 34. The upper lip 34 is bolted to a lower lip 35. The lower lip 35 is welded to a scalloped segment 36. The scalloped segment 36 is a segment of a circle with its inner edge shaped to conform to the outer surface 25 of the inner liner 20. To accomplish this, half circles, having the same radius as the parallel tubes 21, are cut along the bottom edge of the scalloped segment 36. This bottom edge is then welded to the outer surface 25 of the inner liner 20, sealing the plenum assembly 30 to the inner liner 20.

If the plenum assembly 30 does not totally encircle the cylinder 23, a second two sidewalls, generally designated 32, shown in FIG. 2, are required. The second two sidewalls 32 are comprised of an assembly of various components similar to the first two sidewalls 37, the difference being that the scalloped segment 36 is not required. The second two sidewalls 32 run parallel to the longitudinal axes of the parallel tubes 21 and are parallel to each other. Because the second two sidewalls 32 run parallel to the longitudinal axes of the parallel tubes 21 the lower lip 35 may be welded directly to the tops of two adjacent tubes 26 and 27 forming the necessary seal around the plenum assembly 30 without the need for the scalloped segment 36.

An expansible supply duct 40 is attached to the plenum assembly 30 and to the vessel wall 10. The inner end 41 of the expansible supply duct 40 is sealably attached perpendicular to the top 31 of the plenum assembly 30 and the inner liner 20. The outer end 42 of the expansible supply duct 40 passes perpendicularly through the vessel wall 10 and is permanently attached to the inside of a nozzle 11, which is permanently attached to the vessel wall 10. A gas injection inlet 12 may then be removably attached to the nozzle 11. The expansible supply duct 40 is located in the space between the inner liner 20 and the vessel wall 10. A spool piece, generally designated 43, connects the outer end 42 and the inner end 41. The longitudinal axis of the spool piece 43 is parallel to the inner liner 20 and the vessel wall 10. This is accomplished by forming two right angle bends in the expansible supply duct 40, one at the inner end 41 and one at the outer end 42.

The spool piece 43 consists of two bellows sections 44. The bellows sections 44 are attached to the inner end 41 and the outer end 42 by means of gasketed connectors 45. These gasketed connectors 45 consist of heat resistant gaskets between two flanges.

Thus, a gas injection apparatus for injecting quench gas into a hot gas stream carried in a lined vessel is disclosed. As would be apparent to those skilled in the art, the embodiments and applications of the invention shown and described herein are only a few of the many modifications that are possible without departing from the disclosed inventive concepts. The invention, therefore, is not to be restricted except by the scope of the appended claims.

What is claimed is:

1. A gas injection apparatus in combination with a lined vessel wherein said lined vessel includes a vessel wall and an inner liner, said inner liner comprising a series of parallel tubes radially joined together by web members, said inner liner being spaced apart from the vessel wall and having an inner surface and an outer surface, said gas injection apparatus comprising at least one plenum assembly sealably attached to the outer surface of the inner liner; the inner liner having openings positioned and arranged to provide communication between the interior of the vessel and the area defined by said plenum assembly and the inner liner for injection of gas into the interior of said vessel perpendicularly to the plane of the inner liner; said gas injection apparatus further comprising an expansible supply duct attached to and extending between the vessel wall and said plenum assembly.

2. The combination of claim 1, wherein said expansible supply duct comprises an outer end, an inner end and a spool piece, said outer end passes perpendicularly through the vessel wall, said inner end is sealably attached to said plenum assembly perpendicular to the inner liner, said spool piece connects said outer end and said inner end, and the longitudinal axis of said spool piece is parallel to the inner liner.

3. A gas injection apparatus in combination with a lined vessel having a vessel wall and an inner liner spaced apart from the vessel wall; wherein said inner liner comprises a series of parallel tubes radially joined together by web members to form a cylinder having an outer surface; said gas injection apparatus comprising at least one plenum assembly sealably attached to said outer surface; said inner liner having openings positioned and arranged to provide communication between the interior of the vessel and the area defined by said plenum assembly and said inner liner such that a gas may be injected into the interior of said vessel perpendicularly to the plane of said inner liner; said gas injection apparatus further comprising an expansible supply duct having an outer end passing perpendicularly through said vessel wall, an inner end sealably attached perpendicularly to said plenum assembly, and a spool piece connecting said outer end and said inner end, such that the longitudinal axis of said spool piece is parallel to said inner liner; wherein said spool piece comprises at least one bellows section.

4. The combination of claim 3, wherein said outer end of said supply duct is permanently attached to a nozzle, and said nozzle is permanently attached to the vessel wall.

5. The combination of claim 3, wherein said bellows section is removably attached to said first end and said second end of said supply duct by gasketed connectors.

6. The combination of claim 3, wherein said openings are slots cut in said web members parallel to said parallel tubes in the area of said inner liner covered by said plenum assembly such that a gas may be injected into the cylinder perpendicularly to the longitudinal axis of said inner liner.

7. The combination of claim 3, wherein said plenum assembly comprises a top having the same curvature as said outer surface of said inner liner, sealably attached to said inner liner by at least two sidewalls, said sidewalls being attached to said outer surface perpendicularly to the longitudinal axes of said parallel tubes.

8. The combination of claim 7, wherein said sidewalls are parallel to each other and each sidewall comprises an upper lip removably attached to a lower lip; a bar permanently attached between said top and said upper lip; a scalloped segment formed to conform to the contours of said outer surface of said inner liner, said scalloped segment permanently attached between said lower lip and said outer surface of said inner liner.

9. The combination of claim 3, wherein said plenum assembly comprises a top having the same curvature as said outer surface of said inner liner sealably attached to said inner liner by a first two sidewalls and a second two sidewalls.

10. The combination of claim 9, wherein said first two sidewalls are parallel to each other and are attached to said outer surface perpendicularly to the longitudinal axes of said parallel tubes and comprise an upper lip removably attached to a lower lip, a bar permanently attached between said top and said upper lip, a scalloped segment formed to conform to the contours of said outer surface of said inner liner, said scalloped segment being permanently attached between said lower lip and said outer surface of said inner liner.

11. The combination of claim 9, wherein said second two sidewalls are parallel to each other and are attached to said outer surface parallel to the longitudinal axes of said parallel tubes and comprise an upper lip removably attached to a lower lip and a bar permanently attached between said top and said upper lip, wherein said lower lip is sealably attached to said outer surface of said inner liner.

* * * * *